United States Patent
Oakes et al.

[11] Patent Number: 5,814,771
[45] Date of Patent: Sep. 29, 1998

[54] ON-BOARD MICROPROCESSOR CONTROLLED LOAD WEIGHING SYSTEM

[75] Inventors: Bryan R. Oakes, Redmond; Peter B. Mortensen; Peter N. Nguyen, both of Renton; Rick A. Beets, Issaquah, all of Wash.

[73] Assignee: Structural Instrumentation, Inc., Tukwila, Wash.

[21] Appl. No.: 602,710

[22] Filed: Feb. 16, 1996

[51] Int. Cl.⁶ .................................................. G01G 19/08
[52] U.S. Cl. ......................................................... 177/136
[58] Field of Search .................................. 177/136, 137, 177/138, 139, 141, 25.14

[56] References Cited

U.S. PATENT DOCUMENTS

| | | | |
|---|---|---|---|
| 2,923,540 | 2/1960 | Yost et al. | 177/136 |
| 3,990,032 | 11/1976 | Fish et al. | 177/136 |
| 4,020,911 | 5/1977 | English et al. | 177/136 |
| 4,042,049 | 8/1977 | Reichow et al. | 177/136 |
| 4,212,360 | 7/1980 | Chesher | 177/136 |
| 4,421,186 | 12/1983 | Bradley | 177/136 |
| 4,511,974 | 4/1985 | Nakane et al. | 177/136 |
| 4,638,876 | 1/1987 | Baldwin et al. | 177/136 |
| 4,645,018 | 2/1987 | Garbade et al. | 177/136 |
| 4,714,122 | 12/1987 | Appleton et al. | 177/136 |
| 4,771,837 | 9/1988 | Appleton et al. | 177/136 |
| 4,809,794 | 3/1989 | Balir et al. | 177/136 |
| 4,815,547 | 3/1989 | Dillon et al. | 177/25.14 |
| 4,832,141 | 5/1989 | Perini et al. | 177/136 |
| 4,852,674 | 8/1989 | Gudat | 177/141 |
| 4,854,406 | 8/1989 | Appleton et al. | 177/136 |
| 4,969,112 | 11/1990 | Castle | 177/136 X |
| 5,178,226 | 1/1993 | Bowman et al. | 177/136 |
| 5,182,712 | 1/1993 | Kyrtsos et al. | 177/141 X |
| 5,224,815 | 7/1993 | Abels et al. | 177/136 |
| 5,230,393 | 7/1993 | Mezey | 177/136 |
| 5,245,137 | 9/1993 | Bowman et al. | 177/136 |
| 5,416,706 | 5/1995 | Hagenbuch | 177/136 X |
| 5,478,974 | 12/1995 | O'Dea | 177/25.14 |
| B1 4,839,835 | 6/1989 | Hagenbuch | 177/136 |

FOREIGN PATENT DOCUMENTS 1305191   7/1992   Canada.

*Primary Examiner*—Michael L. Gellner
*Assistant Examiner*—Randy W. Gibson
*Attorney, Agent, or Firm*—Christensen O'Connor Johnson & Kindness PLLC

[57] ABSTRACT

An on-board load weighing system for determining the magnitude of the load carried by a tractor trailer truck is provided. The weighing system includes one or more load sensors that are placed between the load platform on which the load is applied and the suspension system of the truck/trailer. The load sensors are connected to one or more transmitters. Each transmitter includes an on-board microprocessor that has its own memory. The microprocessors use calibration data stored within the memory combined with data provided by the load sensors to determine the magnitude of the load being applied to the load sensors. The transmitters then provide an indication of the load being applied to the load sensors to a master controller located in the cab of the truck. Each transmitter is connected to the master controller in a network. Upon power-up, the on-board controller interrogates each of the transmitters in the network in order to determine how many transmitters are present. During operation, the on-board controller receives load data from each transmitter and displays the resulting load data on a display in the truck. Each transmitter can also include an attitude sensor and temperature sensor. The attitude sensor provides the transmitter with data regarding the attitude of the vehicle in which the transmitter is mounted while the temperature sensor provides the transmitter with temperature data. The transmitter uses the attitude data and temperature data along with calibration coefficients in order to increase the accuracy of the system.

19 Claims, 4 Drawing Sheets

ON-BOARD MICROPROCESSOR CONTROLLED LOAD WEIGHING SYSTEM

Field of the Invention

The invention relates to load weighing systems and, more particularly, to on-board vehicle load weighing systems that use on-board beam or other type load cells for determining wheel, axle or total on-board weight for trucks or other vehicles.

BACKGROUND OF THE INVENTION

On-board load weighing systems have been used on trucks and other vehicles for many years. Early on-board truck load weighing systems used hydraulic load sensors or air pressure sensors connected to the suspension system between the frame of the truck and the load platform or cargo container of the truck. The hydraulic load sensors or air pressure sensors were connected to the suspension system and were also connected to a dial pressure indicator. As an increase in load was placed on the load platform, an increase in pressure was developed within the hydraulic or air pressure sensor. This increase in pressure provided the user an indication of the load placed on the load platform by a displacing the dial pressure indicator. Such early load weighing systems were highly inaccurate and were also prone to non-linearity and temperature errors. Essentially, such early load weighing systems provided an indication of when the load on the vehicle exceeded a specified point and not a measurement of accurate load magnitudes.

The next generation of on-board load weighing systems incorporated on-board beam-type bending or shear load cells. The beam-type load cells were mounted between the frame and load platform or cargo container of the vehicle. Strain gauges were mounted on the load cells and connected to electrical monitoring equipment. As an increasing load was placed on the platform, it produced an increasing deflection of the load cell. These deflections or strains were detected by the strain gauges and the resulting data was passed to the electrical monitoring equipment in the form of an analog signal. The electrical monitoring equipment then used the information provided by the analog signal along with various calibration data to determine the force and thus load placed on the load platform. Such early electronic load weighing systems greatly increased the accuracy and dependability of on-board load weighing systems.

Early on-board electronic load weighing systems used beam-type load cells located near each axle of the truck. The beam-type load cells were connected to an on-board electronic controller and display system that were both located in the cab of the truck. Generally, all of the load cells on the axles of the truck were connected to one signal amplifier in the controller and all of the load cells connected to the trailer were connected to a separate signal amplifier in the controller. Individual electrical cables were passed from the on-board controller in the cab of the truck to each of the load cells. These electrical cables had to be connected or disconnected when a truck/trailer combination was changed. In addition, each time a truck/trailer combination was changed the entire electric load weighing system had to be recalibrated.

In the early on-board electronic load systems described above, each amplifier in the controller was connected to a multiplexer which was in turn connected to an analog to digital (AID) converter and a digital display. Using the multiplexer, the truck's operator could select which data channel to display information from on the electronic display. This allowed the operator to separately observe load data from both the truck and the trailer. Such early on-board electronic load systems did not incorporate microprocessors and thus analog zero and span controls were built into the controller to allow the system to be calibrated. Calibrating such load systems was time-consuming and required the operator to be experienced and skilled in the calibration methods used.

Although such early one-board load weighing systems greatly increased the accuracy over prior load weighing systems, they still had a number of disadvantages. As discussed above, separate electrical cables had to be run from the cab of the truck to each load cell on the truck and trailer. Such electrical cables increased the complexity of the system and were prone to physical damage in the harsh environment in which the trucks operated. In addition, the long lengths of electrical cabling used were prone to signal loss and induced electrical noise thus producing inaccuracies in the system output. To boost system output, often additional analog amplifiers were placed on the trailer to boost the analog signal as it passed between the load cells and the cab mounted controller.

Current on-board load weighing systems have improved upon early electronic on-board load systems by placing on-board transmitters near the location of the load cells. Such on-board transmitters are generally placed near each axle at which load cells are located. Thus, one transmitter is generally located on the trailer and a second transmitter on the truck. Each transmitter is connected to the load cells and is also connected to an on-board scale indicator that is located within the cab of the truck.

Each transmitter includes two input channels, thus allowing the load cells on the left and right side of the truck or trailer to be connected to a separate input channel. Each input channel is in turn connected to a separate amplifier located within the transmitter. Each amplifier is connected to a multiplexer which is connected to an analog to digital (A/D) converter or a voltage to frequency (V\F) converter. The frequency or digital output signal produced by the V\F converter or A/D converter is passed from the transmitter over an electrical cable to the on-board controller within the cab of the truck.

The scale indicator in the cab of the truck includes a microprocessor that uses the output signal from the transmitters to calculate a signal indicative of the load being carried by the tractor trailer truck. The scale indicator also includes a memory that allows calculation, calibration and other data used by the microprocessor to be stored in the scale indicator.

Current on-board load weighing systems' use of transmitters located near the load cells and scale indicator increases the versatility of the system. The use of transmitters located near the location of the load cells also reduces inaccuracies produced by analog signal loss in prior load weighing system outputs. In current on-board load weighing systems using V/F converters, the output signal is piggy-backed on the electrical cable supplying power to the transmitter, thus decreasing the number of electrical lines running between the tractor trailer and the cab of the truck.

Although current on-board load weighing systems have improved dramatically on prior on-board load weighing systems, they still have a number of shortfalls. Current on-board transmitters can only handle a limited number of load cells per transmitter. Current on-board systems are also not easily expanded or reconfigured to account for the use of additional load cells etc. Current on-board load weighing systems also store calibration data within the memory of the scale indicator in the cab of the truck. Therefore, when a trailer is attached to the truck, it must be configured and calibrated for use in the individual truck/trailer combination. If the truck/trailer combination is altered by replacing the trailer or adding an additional trailer, the entire load weighing system must be reconfigured and recalibrated. When a second or third trailer is added to the truck, additional indicators must also be added to the cab of the truck to control the transmitters on additional trailers or the indicator must be reconfigured with additional multiplexed channels.

Separate electrical cables are run from the controllers located in the cab of the truck to each individual transmitter. The use of separate electrical cables for each transmitter increases the chances that one or more of the electrical cables are going to be physically damaged or corroded thus affecting system performance. As discussed above, the individual controller/transmitter configurations must also be calibrated each time trailers are added, subtracted or exchanged. The process by which the load weighing systems are calibrated is time-consuming and requires an operator to be trained in the calibration of the system.

As can be seen from the discussion above, current on-board load weighing systems have a number of areas in need of improvement. The present invention is directed toward improving on-board load weighing systems and meeting some of these needs.

SUMMARY OF THE INVENTION

The present invention is an improved on-board load weighing system for use in trucks, other vehicles, or fixed load platform applications. The on-board load system includes one or more load sensors such as load cells or other load measuring devices that are used to detect the load carried within the interior of the truck or other vehicle on which the system is mounted. In one embodiment, beam-type load cells are mounted between the trailer and truck's suspension system. The load cells deflect as a load of increasing magnitude is placed within the trailer. The load weighing system also includes one or more transmitters that are connected to the load cells. Generally, one transmitter is located on each trailer and one transmitter on the truck. The transmitters include on-board microprocessors that are connected to the master controller in a network. During power-up, the master controller includes means for interrogating each of the transmitters in order to identify how many transmitters are present in the network and to assign each transmitter a unique identity. During operation, the transmitters receive strain data from the load cells mounted on the truck. The transmitters use the data obtained from the load cells along with the calibration data stored in an on-board memory in order to produce digital output signal indicative of the load being applied to the load cells connected to the transmitter. The signal indicative of load is passed to the master controller over the network. The master controller displays information provided by the transmitters to the user in the form of axle weights, total vehicle weights, left or right channel weights, etc.

In accordance with other aspects of the invention, the transmitter includes a temperature sensor that is attached to the microprocessor. The temperature sensor provides the transmitter an indication of the environmental temperature near the load cells. The microprocessor uses the information from the temperature sensor to account for changes in load output from the load cells due to changes in temperature. An attitude sensor is also connected to the microprocessor. The attitude sensor provides the transmitter an indication of the attitude of the vehicle upon which the transmitter is mounted. The transmitter uses the attitude indication combined with calibration data stored in the on-board memory to account for the effects of vehicle attitude on the output from the load cells.

In accordance with yet other aspects of the invention, a voltage sensor is connected to the transmitter. The voltage sensor measures the voltage of the power being supplied to the transmitter and passes the information in the form of an output signal to the microprocessor. The microprocessor uses the indication of voltage as an indication of an error in the load weighing system, or of the presence of too many transmitters connected in the network.

The load weighing system has a number of advantages over prior art systems. The transmitters have an on-board memory that is capable of storing calibration data and other data reduction information. The transmitters also include an on-board microprocessor that uses the calibration data to produce load data using the output from the load cells. The transmitters and load cells on an individual trailer are precalibrated after their being connected to a trailer. This allows truck/trailer combinations to be interchanged or additional trailers to be added without recalibrating the entire load weighing system.

Another advantage of the load weighing system is an increased accuracy due to the invention's use of passing a digital signal between the transmitters and the on-board controller. In prior load weighing systems, long cables were run between the trailer and cab of the truck. These cables were susceptible to analog signal loss. In addition, the present invention's use of a single cable running between the cab of the truck and all of the transmitters in the system eliminates the unwanted and undesirable use of multiple cables running between the truck and trailer. Thus, the load weighing system of the invention is less prone to physical damage and also decreases the number of connections to deal with when trailers are added or changed.

The various transmitters used in the load weighing systems are also connected in a self-detecting network. Because the on-board controller is capable of interrogating the network to determine how many transmitters are present, the operator does not need to provide any additional data to the load weighing system when additional trailers are added to or subtracted from the truck/trailer combination.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAIL DESCRIPTION Of THE PREFERRED EMBODIMENT

Figure 1:
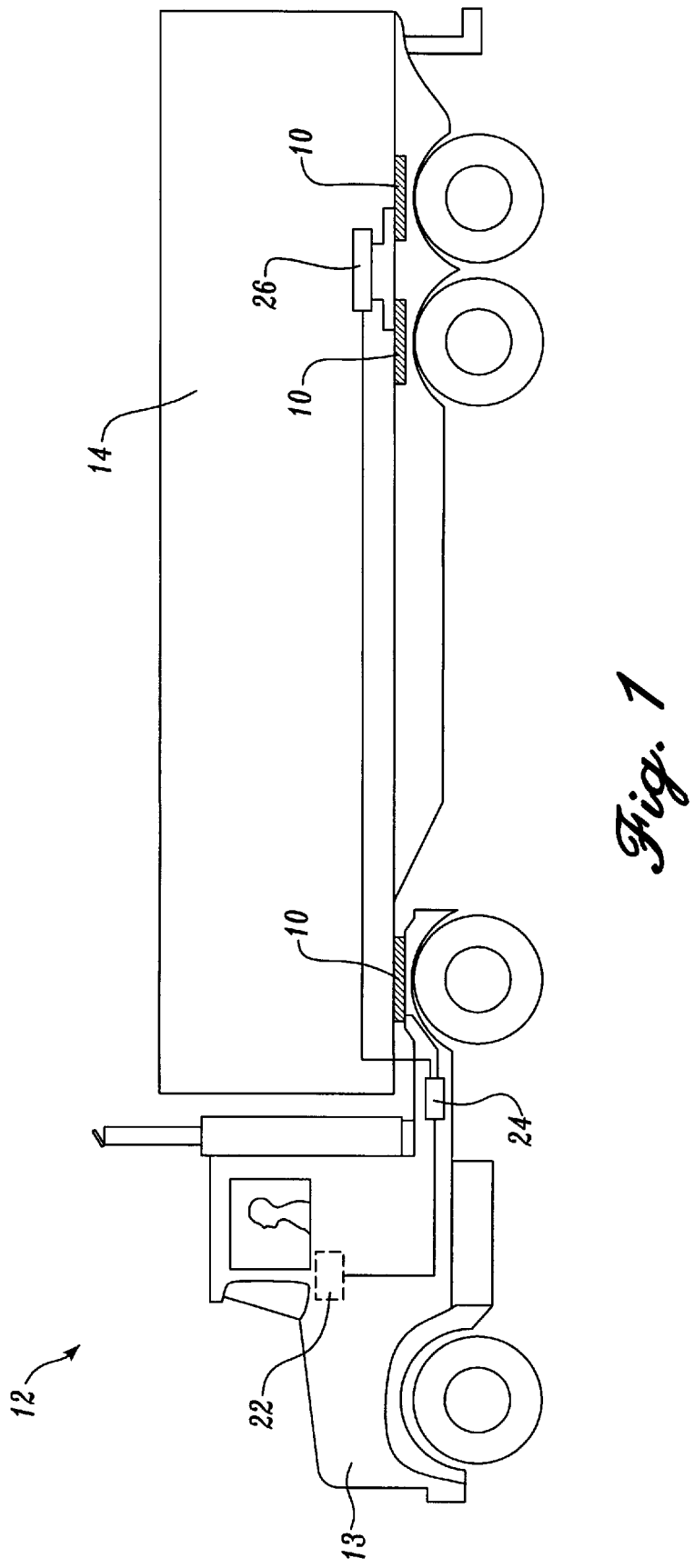
FIG. 1 is a side schematic view of a tractor trailer truck including an on-board load weighing system according to the present invention.

FIG. 1 illustrates an on-board load weighing system according to the present invention as installed in a tractor trailer truck 12. The tractor trailer truck 12 includes a truck 13 and a trailer 14. Although the preferred embodiment of the present invention is described with respect to use in a tractor trailer truck 12, a load weighing system according to the invention can be used on other types of vehicles or can be used with load weighing systems installed at fixed installations such as the type that use platform scales.

The preferred embodiment is discussed by reference to use with a vehicle having an on-board computer and an integrated display that is built into its instrument panel. However, the present invention can also be used with vehicles that do not have on-board computers or integrated displays. In such applications, an integrated display and depending on the application, additional electronics can be added to the on-board load weighing system or vehicle in which the system is installed.

In the preferred embodiment, the on-board load weighing system is used with one or more shear or bending beam-type load cells 10. The load cells 10 are located on both the tractor 13 and the trailer 14 as illustrated in FIG. 1. The load cell's 10 structure, mounting locations and attachment methods can vary depending upon the type of truck and application. The structure and operation of beam-type load cells and their installation and mounting considerations and configurations are well known in the art and are thus not discussed in detail in the description of the invention.

The on-board load weighing system of the invention can be used with various types and configurations of load sensors such as load cells 10. The description of the preferred embodiment of the load weighing system with respect to beam-type load sensors such as load cells 10 is exemplary only and not meant to limit the scope of the invention. For example, in alternative embodiments of the invention, other types of load sensors can be used or the invention could be used with platform-type load systems installed at a stationary installations. The present invention could also be used with load weighing systems that incorporate hydraulic pressure or displacement sensors as opposed to the load cells described in the preferred embodiment.

The load cells 10 are arranged on the truck 12 to obtain the overall weight carried on the load platform, in this case within the trailer 14. In the preferred configuration, the load cells 10 are located near each axle of the tractor trailer truck that supports the weight in the trailer 14. Generally, two load cells 10 are used to measure the weight applied to each axle supporting the trailer 14. One load cell 10 is positioned on the right side of each axle and another load cell is positioned on the left side of each axle. Each load cell 10 is mounted between the frame of the truck and trailer 14 such that as an increasing load is added to the trailer an increasing force passes through the load cells 10 and into the suspension of the trailer 14 and truck 13.

Increasing the magnitude of the cargo carried within the trailer 14 places an increasing force on each of the load cells 10. This increasing force applied to the load cells 10 causes the load cells to deflect. Although such deflections are not visually observable, they are measured through the use of strain gauges or other measuring devices attached to the load cells.

Figure 2:
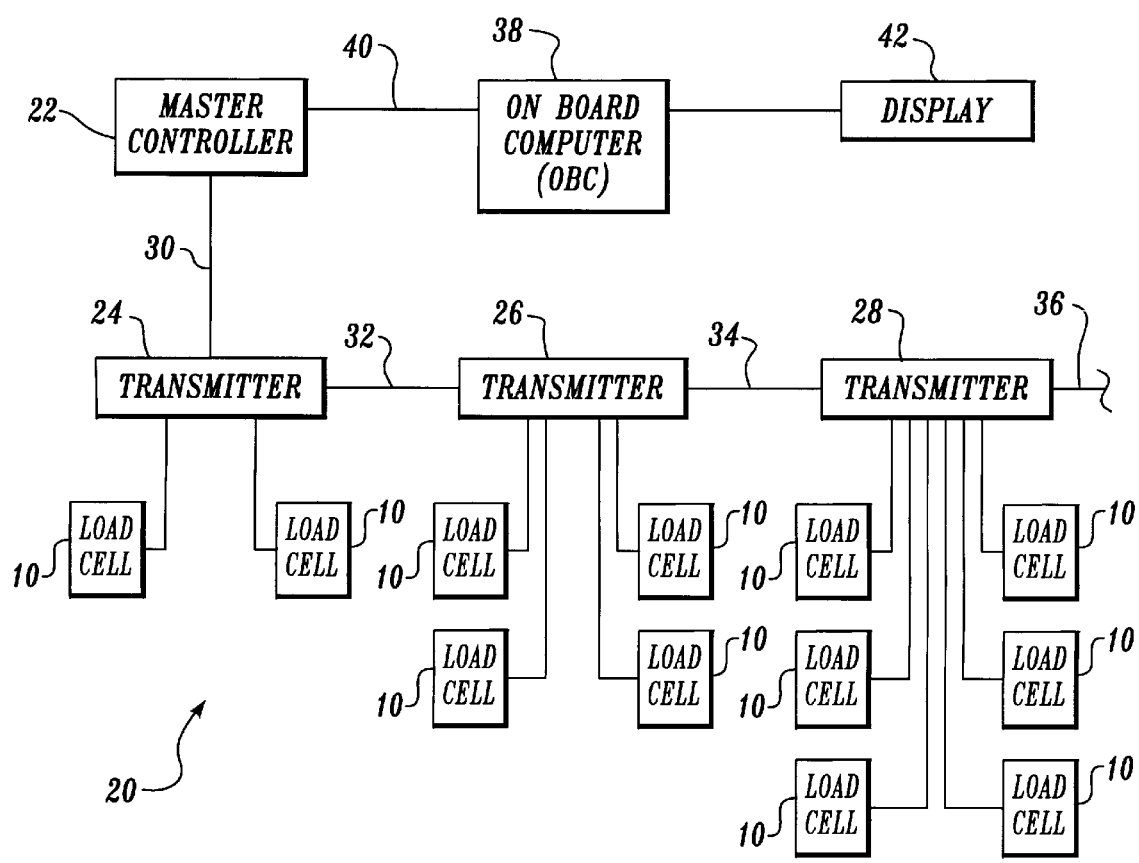
FIG. 2 is a schematic diagram illustrating an on-board load weighing system according to the present invention.

An overview of the preferred embodiment of the load weighing system 20 is illustrated in FIG. 2. The load weighing system 20 includes a master controller 22 and one or more transmitters 24, 26, 28, etc., connected in a network. The load cells 10 are connected to the transmitters 24, 26, 28, etc., as described in detail below. The master controller 22 is connected to the first transmitter 24 and the truck's on-board computer 38 and display 42 through electrical cable 40. Depending upon the application, the master controller 22 can alternatively be connected to a display installed in the truck specifically to display information from the master controller.

In the preferred embodiment, the master controller 22 is mounted in the cab of the truck 13. The individual transmitters 24, 26, 28, etc., are mounted on the truck and trailer 14, as discussed above. Generally, a single transmitter 24 is mounted on each trailer 14. However, in alternate embodiments of the invention more than one transmitter could be located on each trailer. A transmitter is also generally mounted on the truck 13 to monitor any load cells mounted on the truck.

The first transmitter 24 is connected to the master controller 22 by an electrical cable 30. The second transmitter 26 is connected to the first transmitter 24 by electrical cable 32. The third transmitter 28 is connected to the second transmitter 26 by electrical cable 34. Similarly, a fourth transmitter (not shown) can be connected to the third transmitter 28 by electrical cable 36. If required, additional transmitters can be connected into the load weighing system 22 in a manner similar to that described with respect to the first, second and third transmitters 24, 26 and 28.

The various load cells 10 used on the tractor trailer truck 12 are connected to the transmitters 24, 26, 28, etc. Generally, all of the load cells on the truck are connected to the first transmitter 24 while all of the load cells on the first trailer 14 are connected to the second transmitter 26. Similarly, all the load cells on a second trailer are connected to the second transmitter 28 and so on. As shown in FIG. 2, each transmitter is capable of handling multiple load cells.

The structure and operation of an individual transmitter will now be discussed by reference to FIG. 3. In the preferred embodiment, each of the transmitters 24, 26 and 28 are identical internally and thus the structure and operation of each transmitter may be understood by a discussion of the first transmitter 24. The transmitter 24 includes a power regulator/supply 44, left and right channel amplifiers 46 and 48, left and right channel A/D converters 50 and 52, a microcomputer or microprocessor 54, a serial data interface 56, a metal oxide silicon effect transmitter ("MOSFET switch") 58 and, depending upon the application, a voltage sensor 60, a temperature sensor 62, and a level sensor 64.

The power regulator/supply 44 may be either a linear or switching regulator depending upon the number and type of transducers used. In addition, in alternative embodiments of the invention the transmitter could include more or less A/D converters depending upon the application.

The electrical cables 30, 32, 34, 36 etc. connected to the various transmitters are composed of both a power cable 68 and a data cable 70. The power cable 68 is connected to the power regulator/supply 44 which in turn is connected to and directly powers the load cells 10, the amplifiers 46 and 48, the A/D converters 50 and 52, and the microprocessor 54. The power cable 68 is also connected to the MOSFET switch 58.

In alternative embodiments of the invention, the power supply 44 can also provide power directly to the temperature sensor 62, level sensor 54, and any additional electronics that are added on to the transmitter.

As discussed briefly above, in the preferred embodiment the load cells 10 are beam-type load cells that include strain gauges that monitor the deflection of the load cells. As the trailer 14 is loaded, the load cells deflect. These deflections are monitored by the strain gauges and electronics within the load cells. The electronics in the load cells 10 in turn produce analog strain signals indicative of the load cell's deflection. The strain signals are provided to the transmitters to which the load cells are connected. In the preferred embodiment shown, the first transmitter 24 is shown connected to two load cells 10. Although, in alternative embodiments the transmitter could be connected to a different number of load cells.

The load cells 10 are connected to either the left or right channel amplifiers 46 or 48. Generally, the load cells 10 mounted on the left side of the truck are connected to the left channel amplifier 46 as shown by lines 80 and the load cells on the right side of the truck are connected to the right channel amplifier 48, as shown by lines 82.

The strain signals produced by the load cells 10 are amplified by the left and right channel amplifiers 46 and 48 and are then passed to the left and right channel A/D converters 50 and 52 as shown by lines 84 and 86 respectively. The A/D converters 50 and 52 convert the amplified analog strain signals provided from the load cells 10 into digital signals. These digital signals are provided to the microprocessor 54 as shown by lines 88 and 90.

The microprocessor 54 can be any of a number of different types of microprocessors capable of processing digital data. In the preferred embodiment, the microprocessor 54 includes an on-board random access memory (RAM), a read-only memory (ROM) and one or more A/D converters.

The microprocessor 54 is also connected to a serial data interface 56 that is used to pass information into or out of the transmitter 24. In the preferred embodiment, the serial data interface 56 is an RS-485 hardware bus. However, other serial/data interfaces could be used, for example, SAE J1939, SAE J1850, CAN 2, etc. The serial data interface 56 is used both to provide calibration data to the microprocessor 54 and also to pass load data produced through the use of the load cells 10 to the on-board controller 22.

Figure 3:
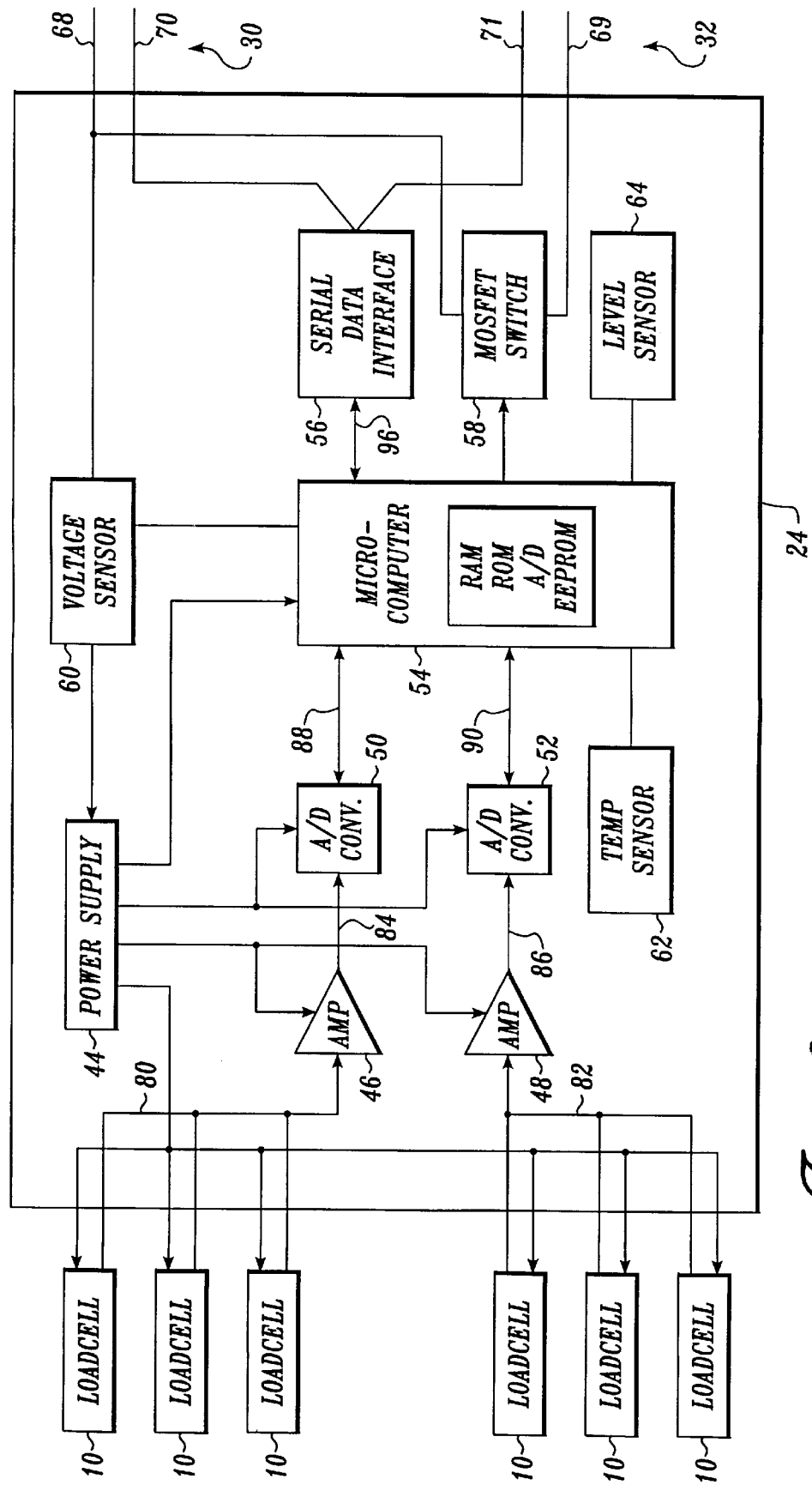
FIG. 3 is a schematic diagram illustrating the components of the transmitter.

In the preferred embodiment, the serial data interface 56 is hooked to the master controller 22 through the data line 70 as shown in FIG. 3. The serial data interface 56 is also connected to the serial to data interface for the next transmitter 26 in the network through the data cable 71 in the electrical cable 32.

The microprocessor 54 performs a number of functions. The microprocessor is used to reduce the data regarding the deflections produced in load cells 10 into a meaningful form such as an axle weight. In order to do so, the microprocessor stores various calibration data within its on-board RAM. Methods to reduce strain data provided by load cells 10 into load data are commonly known in the art and are thus not described in detail.

In the preferred embodiment, the microprocessor 54 is programmed so that it can resolve the strain signals produced by the various load cells 10 into an indication of the load being placed on the load cells connected to either the left or right channels of the transmitter or an overall axle load. The load information produced by the microprocessor 54 is provided to the serial to data interface 56 and subsequently to the master controller 22 over data cable 70.

In addition to resolving load data, the microprocessor 54 can also be used to perform other calculations. For example, in the preferred embodiment, the microprocessor 54 is also connected to the voltage sensor 60, temperature sensor 62, and the level sensor 64. The level sensor 64 may be located either within the transmitter 24 or may be located externally and connected to the microprocessor through an input port.

The level sensor 64 provides the microprocessor an indication of the attitude of the truck or trailer upon which the level sensor is connected. In the preferred embodiment, the level sensor 64 provides information regarding whether the truck is tilted either side to side or front to back. The level data provided by the level sensor 54 can either be converted into a digital form within the level sensor 64 or can be provided to the microprocessor in an analog form and then converted into a digital form through one of the microprocessor's on-board A/D converters. The level signal 64 is used by the microprocessor combined with calibration constants stored in the memory (ROM) to obtain more accurate load information.

Either analytical or experimental methods can be used to produce calibration coefficients that account for the effects of tilting of the trailer or truck upon the strain data obtained from the load cells 10. These calibration coefficients are stored in the microprocessor 54 in the form of either an equation or data table. As the level sensor 64 senses that the truck 14 is not level, the sensor provides an indication of attitude to the microprocessor 54. The microprocessor 54 then uses this indication of attitude along with the calibration constants to account for possible errors in the strain data produced from the load cells 10 caused by the attitude of the truck.

The microprocessor 54 is also connected to the temperature sensor 62. The temperature sensor 62 can be located within the transmitter 24 or can be located externally at a position close to that of the load cells 10. The temperature sensor 62 provides the microprocessor 54 an indication of the environmental temperature at which the load cells 10 are operating. In a manner similar to that described with respect to the level sensor, the temperature sensor can either produce a digital signal or an analog signal. If the temperature sensor produces an analog signal, it is converted to a digital signal and provided to the microprocessor 54 by the A/D converter within the microprocessor. The temperature data provided by the temperature sensor 62 is used by the microprocessor 54 along with calibration data stored within the memory (ROM) to account for possible errors produced by changing environmental temperatures.

In the preferred embodiment, the voltage sensor 68 monitors the voltage of the power passing through the power line 68 to the power regulator/supply 44. The voltage sensor 68 can either be a separate component or can be built directly into the power supply. The voltage sensor 60 provides the microprocessor 54 an indication of the voltage being supplied to the transmitter 24. The voltage information provided by the voltage sensor 60 is used by the microprocessor 54 in order to monitor system performance. For example, if the microprocessor 54 determines that the voltage being supplied to the transmitter is too high or too low, it informs the master controller 22 of the problem by providing an error signal to the master controller through the serial data interface 56 over data line 70. The master controller 22 then provides the operator an indication of system error or adjusts the voltage being provided to the transmitter depending upon the application.

In the preferred embodiment, in addition to serving as an error indicator, the voltage data provided by the voltage sensor 60 is also used as an indication of when too many transmitters have been connected to the on-board weighing system 20. Each additional transmitter that is connected into the on-board weighing system's network results in a drop in system voltage. Thus, if an operator connects too many transmitters to the load weighing system 20, it will result in an impermissible voltage drop that will be detected by the voltage sensors 60 within the applicable transmitter. When detected, the microprocessor 54 in the respective transmitter informs the master controller 22 of the voltage drop. The master controller 22 then informs the operator that there are too many transmitters connected into the network for it to function properly.

In addition to providing data to the master controller 22, the transmitter 24 also receives instructions from the master controller 22 over the data line 70. For example, using the on-board computer 38 or other input source (not shown) the operator can instruct the master controller 22 to display data regarding axle weights, overall vehicle weights, or left or right channel weights. The master controller 22 then interrogates the various transmitters connected to the load weighing system 20 and instructs them to provide it with the requested data. The master controller 22 receives the data from each transmitter and provides the operator an indication of the requested data on the display 42.

The use of an on-board transmitter such as transmitter 24 results in a number of advantages over prior electronic load weighing systems. Each transmitter can be preprogrammed and precalibrated for the various load cells placed on the individual trailer 14. Thus, the transmitter 24 can perform the calibration and data reduction steps used to convert the strain data provided by the load cells 10 into a signal indicative of the load applied to the various load cells on the trailer 14. Because each transmitter 24 contains its own microprocessor and memory, the transmitter and load cells on a trailer can be calibrated upon installation. Thus, when a truck/trailer combination is changed or when additional trailers are added to the truck/trailer combination, the transmitter/load cell combinations do not need to be recalibrated.

The invention also reduces the number of electrical cables that must be run between the cab of the truck and the various trailers attached to the truck. As shown schematically in FIGS. 1 and 2, a single electrical cable is extended from the master controller to the first transmitter 24 mounted on the rear axle of the truck 13. The next transmitter in line, i.e., transmitter 26 mounted on the trailer 14, is connected to the first transmitter 24 by a single electrical cable 32. The electrical cable 32 connecting the first transmitter 24 with the second transmitter 26 includes both a data line 71 and a power line 69. The power line 69 is connected to the MOSFET switch 58 on the first transmitter 24 and to the power supply 44 on the second transmitter 26. The data line 71 is connected to the serial data interface 56 on both transmitters 24 and 26. Data produced by the second transmitter 26 is passed to the master controller 22 through the data line 71, into the serial data interface 56 on the first transmitter 24 and subsequently to the master controller through the data line 70.

The on-board load weighing system 20 allows the master controller 22 to automatically determine the number of transmitters connected to the network. This allows an operator to hook up additional transmitters and thus trailers 14 without having to provide the master controller 22 any additional information. The preferred method for the master controller 22 to determine how many transmitters are connected within the load weighing system 20 is described below with respect to FIG. 4.

Figure 4:
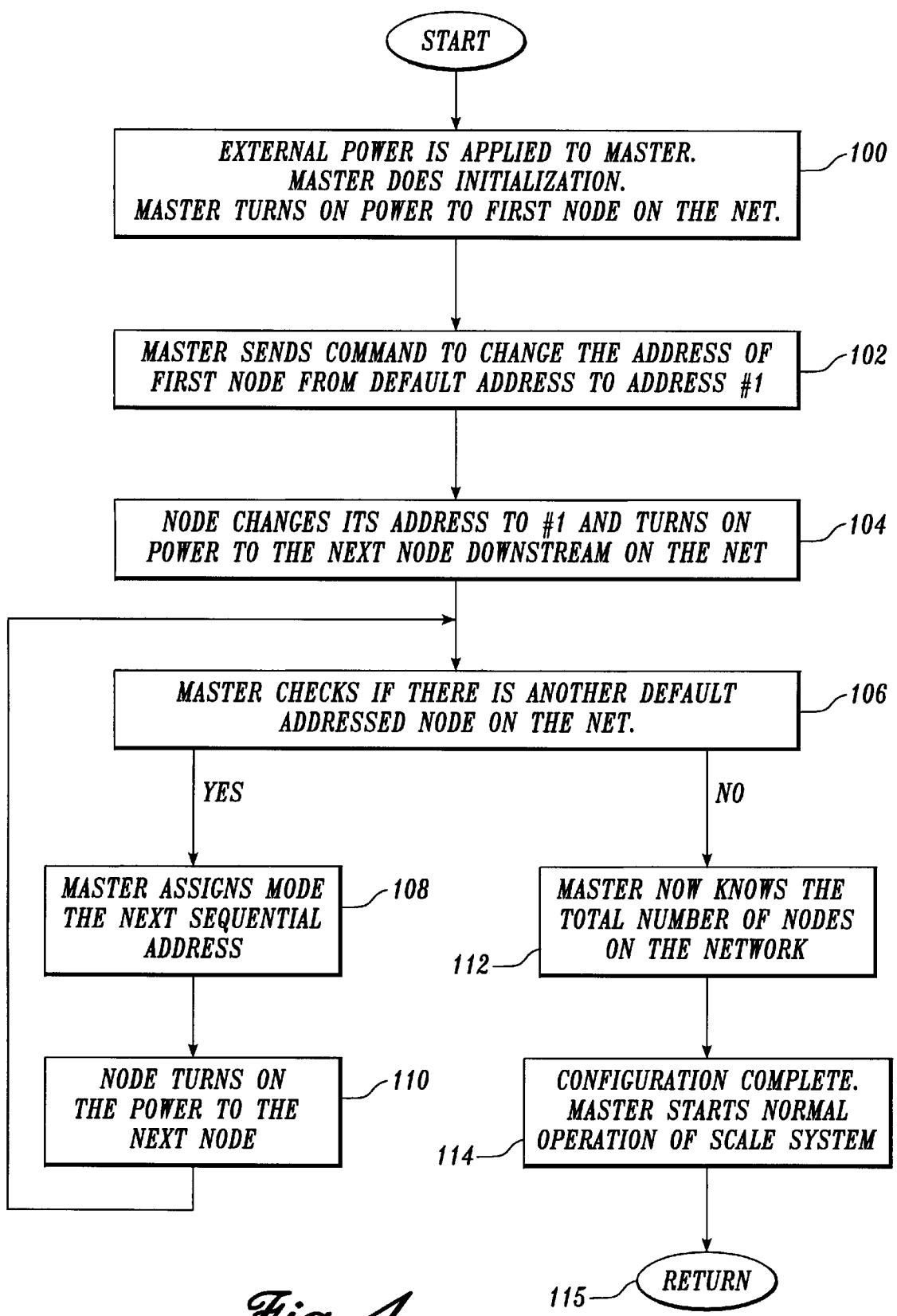
FIG. 4 is a flow chart illustrating a method of sequentially assigning addresses to the transmitters according to the present invention.

Prior to powering up the master controller 22, an operator connects the desired number of trailers and transmitters together to form a network as described above. Once the master controller 22 is powered up, it sequentially interrogates each of the transmitters 24, 26, 28, etc., to determine how many transmitters are present as shown in FIG. 4. Upon power up, the master controller 22 provides power to the first transmitter 24 through the electrical cable 30 as shown by block 100. The master controller 22 then interrogates the first transmitter 24 to determine its address. In the preferred embodiment, each of the transmitters 24, 26, 28, etc., are initially assigned a standard address that is stored within the transmitter's ROM, for example address zero.

Upon interrogation, the first transmitter 24 informs the master controller 22 that it is at address zero. The master controller 22 then instructs the first transmitter 24 to change its address to an assigned value, such as address one as shown by block 102. The first transmitter 24 stores its new address value in the microprocessor's memory (RAM). The master controller 22 then instructs the microprocessor 54 within the first transmitter 24 to turn on the power to the next transmitter in the network, i.e. the second transmitter 26 as illustrated by block 104. As illustrated in FIG. 3, the power cable 68 entering the first transmitter 24 is connected to the MOSFET switch 58 within the transmitter. When instructed by the master controller 22, the microprocessor 54 activates the MOSFET switch 58, thus allowing power to flow through the power cable 69 to the next transmitter downstream, i.e., transmitter 26.

The master controller 22 then interrogates the second transmitter 26 in order to determine its address number as illustrated by block 106. If the second transmitter 26 returns the default address value zero, the master controller 22 instructs the second transmitter 26 to change its address from the default address to the next sequential address, in this case address number two, as illustrated by block 108.

The master controller 22 then instructs the second transmitter 26 to apply power to the next node of the network, i.e. to the third transmitter 28 as illustrated by block 110. Blocks 106–110 are then repeated until all the transmitters in the network have been interrogated and assigned sequential address numbers.

After all of the transmitters have been assigned sequential address numbers, interrogation of the transmitters will not provide the master controller with any transmitters having the default address zero. Under such circumstances, the master controller 22 knows the total number of nodes or transmitters in the network is the number of sequential addresses, in the present case one-three as illustrated in block 112. After the master controller 22 has assigned new addresses to each of the transmitters, the configuration of the network is complete and control is returned to the standard operation of the load weighing system 20 as shown in blocks 114 and 115.

During standard operation of the load weighing system 20, the master controller 22 either continuously or periodically requests load data from each of the transmitters 24, 26 and 28. Such load data is requested as the total load on all of the load cells 10 connected to each transmitter or as a load on a left or right channel basis. When asked, each of the transmitters sorts the data in the manner requested and passes it to the master controller 22. The master controller 22 then provides the on-board computer 38 weight data either by transmitter, by axle, by overall load, or by load on the left or right side of the tractor trailer, etc. The on-board computer 38 then displays the requested data on the display 42.

The load weighing system of the invention has a number of advantages over prior art systems. The use of transmitters having on-board analog to digital converters and microprocessors allow data calibration and manipulation to take place at the transmitter level. Thus, the load cells and transmitters on an individual trailer can be calibrated and the calibration data stored within the memory battery backed up RAM or electronically erasable programmable read only memory (EEPROM) within the transmitter. Once installed and calibrated, the trailer 14 on which the transmitter and load cells are installed can be connected to any available truck containing an appropriate master controller 22. Because the transmitter contains the appropriate calibration data, the truck/trailer combination need not be recalibrated. Therefore, the invention avoids truck/trailer recalibration each time the combination of the truck and trailer are changed.

The invention's use of a networked load weighing system as described above also allows additional transmitters and/or tractor trailers to be installed to the truck without recalibration. The master controller automatically detects the presence of additional transmitters and, thus, tractor trailers upon power up. This feature provides the invention with an automatic configuration ability, eliminating prior time consuming and costly hook up and recalibration procedures. The use of a networked configuration also reduces the number of electrical cables extending between the cab and trailer of the truck.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An on-board load weighing system for measuring the load placed on the load platform of a tractor-trailer truck, the system comprising:
    at least one load sensor coupled to the trailer and load platform and at least one load sensor coupled to the tractor, each load sensor being used to produce a strain signal that is a function of a load placed on the load platform;
    at least one transmitter located on the trailer and electrically connected to said load sensor coupled to the trailer and at least one transmitter located on the tractor and electrically connected to said load sensor coupled to the tractor, each transmitter including a microprocessor, a memory, and a data interface, each of the load sensors providing the transmitter to which said load sensor is connected said strain signal, each transmitter processing said strain signal in combination with calibration data stored within the transmitter memory to produce a load signal indicative of the load placed on the load sensors attached to the respective transmitter, the transmitters located on the tractor and trailer being serially connected to one another to form a chain-like sequence of transmitters; and
    a master controller located on the truck and electrically connected to the transmitter at a first end of the serially connected transmitters to form a network, the master controller receiving said load signals from the transmitters and producing a display signal that is an indication of the load placed on the load platform.

2. The load weighing system of claim 1, wherein additional trailers including additional transmitters are connected to the tractor-trailer truck, the transmitters on each additional trailer being serially connected to the network formed by the master controller and the serially connected transmitters of the tractor-trailer truck to eliminate the need for manual recalibration of the on-board load system when connecting the transmitters of the additional trailers into the network.

3. The load weighing system of claim 1, wherein each transmitter is assigned a predetermined address, the master controller interrogating each of the transmitters connected in the network to determine its address and reassigning each transmitter a unique address that is stored within the memory in the transmitter to allow the master controller to uniquely identify each transmitter within the network.

4. The load weighing system of claim 1, wherein each transmitter includes a left channel and a right channel, said load sensors are located on the right side and the left side of the tractor-trailer with each of said load sensor located on the right side of the tractor-trailer truck being connected to the right channel of the transmitter to which it is connected and said load sensors located on the left side of the truck being connected to the left channel of the transmitter to which is connected.

5. The load weighing system of claim 1, wherein each transmitter includes a switch, and wherein each transmitter, other than the transmitter at the first end of the serially connected chain-like sequence transmitters, is electrically connected to the switch in the prior transmitter of the chain-like sequence of transmitters, each said switch being responsive to an input signal from the master controller to apply power to the next transmitter of the chain-like sequence of transmitters.

6. The load weighing system of claim 1, further comprising an attitude sensor connected to at least one of said transmitter, the attitude sensor providing the transmitter an attitude signal that is a function of the attitude of the load platform to which the transmitter is connected, the transmitter using the attitude signal in combination with attitude calibration data stored in the transmitter memory to produce the load signal having reduced dependence on the attitude of the load platform.

7. The load weighing system of claim 1, further comprising a temperature sensor which produces a temperature signal that is a function of the environmental temperature in which the load sensors are operating, at least one of said transmitters using the temperature signal and calibration data stored within the memory to produce a load signal having reduced dependence on temperature.

8. The load weighing system of claim 1, wherein each transmitter includes a voltage sensor to detect the voltage of power being supplied to said transmitter, the voltage sensor providing a voltage signal to the microprocessor that is a function of the voltage supplied to the transmitter, the microprocessor using the voltage signal to provide the master controller an indication of when the voltage of the power provided to the transmitter falls below an acceptable value.

9. The load weighing system of claim 8, wherein the voltage signal provides the master controller an indication that there is an unacceptable number of transmitters connected in the network.

10. An on-board load weighing system for trucks or other vehicles having a load platform, the system comprising:
    a plurality of load sensors coupled to the load platform, each load sensor producing an output signal that is a function of the load placed on the load platform;
    a plurality of transmitters electrically connected to the load sensors, at least one load sensor being connected to each transmitter, each transmitter including a microprocessor, a memory capable of storing data, and a data interface, the microprocessor receiving the output signal from the load sensors connected to the transmitter and using the output signal along with calibration data stored in the memory to produce a load signal that is a function of the load being placed on the load platform; and a master controller electrically connected to said transmitters to form a network in which the master controller is connected to the first one of the plurality of transmitters and the remaining transmitters are connected in chain-like sequence to the first transmitter, the master controller including a microprocessor that interrogates each transmitter in the network in sequential order to assign each transmitter a unique address to allow the master controller to identify each transmitter, the master controller receiving the load signals from each transmitter and using the load signals to produce a display signal that is a function of the load placed on the load platform.

11. The load weighing system of claim 10, wherein each transmitter includes a power switch and wherein each successive transmitter other than said first one of said plurality of transmitters in the network is connected to the switch in the prior transmitter in the network, the switch being responsive to a control signal from the master controller to apply power to the subsequent transmitter of the network.

12. The load weighing system of claim 10, further comprising at least one attitude sensor connected to one of the transmitters, the attitude sensor producing an attitude signal that is a function of the attitude of the load platform, the microprocessor in the transmitter using the attitude signal combined with attitude calibration data stored in the memory to produce a load output signal having a reduced dependence on the attitude of the vehicle.

13. The load weighing system of claim 10, wherein at least one of the transmitters includes a voltage sensor to detect the voltage of the power supplied to the transmitter, the voltage sensor providing the microprocessor a voltage signal that the microprocessor uses to provide the master controller an indication of when the voltage provided to the transmitter falls below an acceptable value.

14. The load weighing system of claim 12, wherein each transmitter includes a power switch and wherein each successive transmitter in the network is connected to the switch in the prior transmitter in the network, the switches being responsive to a control signal from the master controller to apply power to the subsequent transmitter connected to the switch.

15. An on-board load weighing system for use on tractor trailer trucks, the system comprising:

a plurality of load sensors connected to the truck and a plurality of load sensors connected to the trailer;

a transmitter located on the truck and electrically connected to the load sensors on the truck and a transmitter located on the trailer and electrically connected to the load sensors on the trailer, the load sensors providing the respective transmitters with an output signal that is a function of the load being placed within the trailer, each transmitter including a microprocessor that uses the output signal from the load sensors combined with calibration data stored in a memory in the transmitter to produce a load signal indicative of the load placed on the platform; and a master controller located on the truck and electrically connected to said transmitters to form a network in which the master controller is connected to the transmitter located on the truck and the transmitter on the trailer is connected to the transmitter on the truck, each transmitter being provided a pre-assigned address value each time power is applied to the load weighing system, the master controller interrogating each transmitter sequentially to identify each transmitter and to assign each transmitter a unique address to allow the master controller to uniquely identify each transmitter and thus the load signals provided by each transmitter, the master controller receiving the load signals from said transmitters and producing a display signal.

16. The load weighing system of claim 15, wherein an additional trailer including an additional transmitter may be connected to the tractor-trailer truck, the transmitter on the additional trailer being connected to the transmitter located on the trailer of the tractor-trailer truck, said master controller interrogating said additional transmitter and assigning a unique address to said additional transmitter to allow said master controller to identify the presence of said additional trailer, the transmitter included on the additional trailer, and the signals provided by said additional transmitter to recalibrate the combination of transmitters and load sensors present in the on-board load system.

17. The load weighing system of claim 15, further comprising an attitude sensor connected to said transmitter, the attitude sensor providing the transmitter an attitude signal that is a function of the attitude of the load platform to which the transmitter is connected, the transmitter using the attitude signal in combination with attitude calibration data stored in the memory to produce the load signal having a reduced effect on the attitude of the load platform.

18. The load weighing system of claim 15, wherein each transmitter includes a voltage sensor to detect the voltage of power being supplied to said transmitter, the voltage sensor providing a voltage signal to the microprocessor that is a function of the voltage supplied to the transmitter, the microprocessor using the voltage signal to provide the master controller an indication of when the voltage of the power provided to the transmitter falls below an acceptable value.

19. The load weighing system of claim 15, wherein each transmitter includes a switch, and wherein each transmitter is electrically connected to said switch in the prior transmitter connected in the network, said switches being responsive to an input signal from the master controller to apply power to the subsequent transmitter connected in the network.

* * * * *

UNITED STATES PATENT AND TRADEMARK OFFICE
CERTIFICATE OF CORRECTION

PATENT NO. : 5,814,771
DATED : September 29, 1998
INVENTOR(S) : B.R. Oakes et al.

It is certified that error appears in the above-indentified patent and that said Letters Patent is hereby corrected as shown below:

| COLUMN | LINE | |
|---|---|---|
| 12 (Claim 4, | 11 line 4) | after "tractor-trailer" insert --truck-- |
| 12 (Claim 4, | 15 line 8) | after "which" insert --it-- |
| 12 (Claim 6, | 28 line 3) | "transmitter" (first instance) should read --transmitters-- |
| 12 (Claim 7, | 40 line 6) | before "memory" insert --transmitter-- |
| 13 (Claim 15, | 45 lines 1-2) | "tractor trailer" should read --tractor-trailer-- |

Signed and Sealed this

Fourth Day of May, 1999

*Attest:*

*Attesting Officer*

Q. TODD DICKINSON

*Acting Commissioner of Patents and Trademarks*